(12) United States Patent
Takashima et al.

(10) Patent No.: US 8,757,410 B2
(45) Date of Patent: Jun. 24, 2014

(54) SEALING MECHANISM FOR A CYLINDRICAL CONTAINER OPENING USING A CAP HAVING A CAP BODY AND AN UPPER LID

(75) Inventors: Hiroaki Takashima, Toyama (JP); Yuichiro Moriyama, Toyama (JP); Susumu Niwa, Tokyo (JP); Kazuhiro Umenaka, Tokyo (JP)

(73) Assignee: Hosokawa Yoko Co., Ltd., Tokyo (JP)

( * ) Notice: Subject to any disclaimer, the term of this patent is extended or adjusted under 35 U.S.C. 154(b) by 1485 days.

(21) Appl. No.: 11/441,612

(22) Filed: May 26, 2006

(65) Prior Publication Data

US 2006/0278603 A1 Dec. 14, 2006

(30) Foreign Application Priority Data

May 31, 2005 (JP) ................................. 2005-160265

(51) Int. Cl.
*B65D 45/00* (2006.01)
(52) U.S. Cl.
USPC ........... 215/276; 215/274; 215/349; 215/350; 215/351; 220/319; 220/254.1; 220/259.1
(58) Field of Classification Search
USPC .................. 215/349–351, 276, 274; 220/319, 220/254.1, 259.1
See application file for complete search history.

(56) References Cited

U.S. PATENT DOCUMENTS

| | | | | | |
|---|---|---|---|---|---|
| 3,499,568 | A | * | 3/1970 | Vinas Riera | 215/276 |
| 3,595,419 | A | * | 7/1971 | Dukess | 215/329 |
| 4,111,325 | A | * | 9/1978 | Bellamy et al. | 215/232 |
| 4,176,755 | A | * | 12/1979 | Winchell | 215/48 |
| 4,402,417 | A | * | 9/1983 | Corrigan et al. | 215/232 |
| 4,478,342 | A | * | 10/1984 | Slater et al. | 215/48 |
| 4,673,096 | A | * | 6/1987 | Towns et al. | 215/230 |
| 4,721,215 | A | * | 1/1988 | Bertaud | 215/48 |
| 6,591,998 | B2 | * | 7/2003 | Haynes et al. | 215/276 |
| 2005/0189354 | A1 | | 9/2005 | Heather et al. | |

FOREIGN PATENT DOCUMENTS

| | | |
|---|---|---|
| AU | 1997-26412 | 11/1997 |
| DE | 7436696 | 4/1975 |
| DE | 3601783 A1 | 7/1986 |
| EP | 0 323 812 | 7/1989 |
| GB | 2190903 A * | 12/1987 |

(Continued)

OTHER PUBLICATIONS

Pye, R., "Assembling parts in the mold." Jul. 1970. *Modern Plastics*, vol. 47, No. 7, pp. 90-94.

*Primary Examiner* — Anthony Stashick
*Assistant Examiner* — Blaine Neway
(74) *Attorney, Agent, or Firm* — Ladas & Parry LLP

(57) ABSTRACT

A sealing mechanism for a container opening having a cylindrical opening disposed on a container body and a cap for sealing the cylindrical opening. The cap includes a screw-on cap body and an upper lid for sealing the cylindrical opening. The cap body and the upper lid are independent of each other so that the cap body can be rotated without rotating the upper lid and are engaged by a concave/convex portion. When the cap body is moved away from the container, the cap body slidably abuts on the upper lid, and pushes up the upper lid to open the cylindrical opening, and when the cap body moves toward the container, the cap abuts on the upper lid and pulls down the upper lid to re-seal the cylindrical opening.

4 Claims, 13 Drawing Sheets

(56) References Cited

FOREIGN PATENT DOCUMENTS

| | | |
|---|---|---|
| JP | S49-26614 | 7/1974 |
| JP | 64-23434 | 2/1989 |
| JP | 08-011873 | 1/1996 |
| JP | 3069658 U | 3/2000 |
| JP | 2001-278323 A | 10/2001 |
| JP | 2004-83080 | 3/2004 |
| WO | WO 97-39953 | 10/1997 |
| WO | WO 99-50050 | 10/1999 |
| WO | WO 01-74683 | 10/2001 |

* cited by examiner

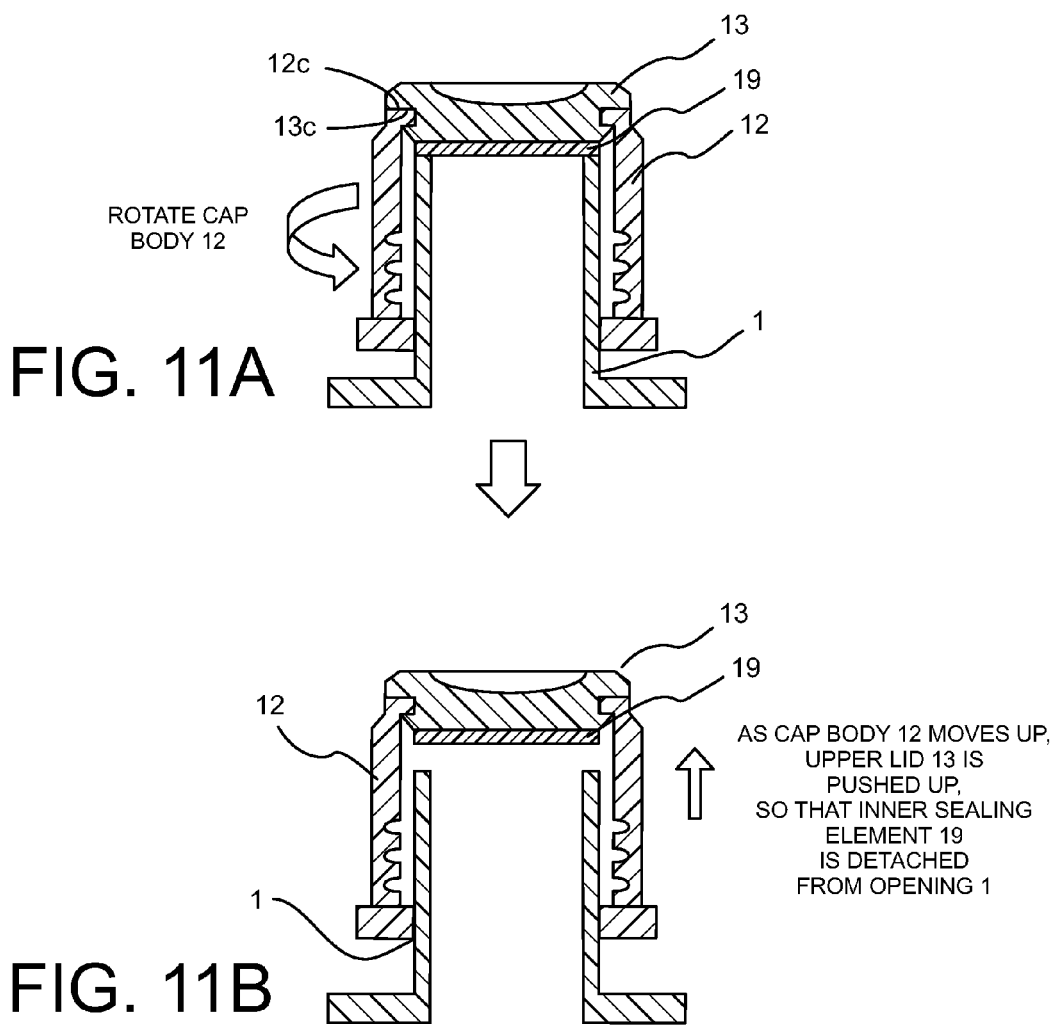

A-A Section

A-A Section

SEALING MECHANISM FOR A CYLINDRICAL CONTAINER OPENING USING A CAP HAVING A CAP BODY AND AN UPPER LID

BACKGROUND OF THE INVENTION

1. Field of the Invention

The present invention relates to a sealing mechanism for container opening having a combination of a cylindrical opening formed on a container body and a cap for sealing the cylindrical opening.

2. Description of the Related Art

A container provided with: a cylindrical opening acting as an outlet (a pouring opening) for the content; and a cap for sealing the cylindrical opening is widely used as a container for liquid beverage, fluid food, seasonings and so on. In such a container of a type that the opening is sealed only by an engagement between the cap and the cylindrical opening, there are concerns that the content may leak out of the container due to a defective molding or flaw at the engagement portion. Furthermore, in the case that the container in which the content is filled and sealed is subjected to a retort treatment which is a sterilization by heating to a high temperature, there is a risk that the content may leak out, due to a pressure rising in the container during the retort treatment. Furthermore, if there is difference of shrinkage or expansion ratio between the cap and the cylindrical opening in the retort treatment, the sealing of the opening may become insufficient, resulting in the leakage of the content.

Conventionally, in order to improve the sealing performance of the container having such a cylindrical opening, the opening is sealed by using an inner sealing element capable of adhering to the opening. However, in order to take the content out of the container sealed with the inner sealing element, the cap needs to be opened firstly, and then the inner sealing element adhering to the opening needs to be peeled off from the opening. It is bothersome.

In view of the above concerns or problems, there is proposed a container which allows an inner sealing element to be peeled off from the opening at the same time when the cap is opened. For example, Japanese examined Utility Model Application Publication No. S49-26614 and Japanese Patent Application Laid-Open No. 2004-83080 describe a sealing device in which an inner sealing element adheres to both the lip of the opening and the inside surface of the cap in such a manner that an adhesion force between the inner sealing element and the inside surface of the cap is greater than an adhesion force between the inner sealing element and the lip of the opening. Thereby, when the cap is opened, the inner sealing element can be peeled off automatically from the lip of the opening, while the adhesion between the inner sealing element and the inside of the cap is maintained.

SUMMARY OF THE INVENTION

In the sealing device according to these patent documents, however, a strong force is required for generating a shear force at an interface between the opening and the inner sealing element by rotating the cap, in order to peel off the inner sealing element from the opening.

The present invention has been accomplished in view of the above problems. It is therefore an object of the invention to provide a sealing mechanism allowing to peel off the inner sealing element from the opening with a weak force at the same time when the cap is opened, in comparison with a mechanism of peeling off the inner sealing element with a shear force by rotating the cap.

A sealing mechanism for container opening according to the present invention is provided with: a combination of a cylindrical opening formed on a container body and a cap for sealing the cylindrical opening, wherein the cap comprises: a cap body having a cylindrical shape for covering a side surface of the cylindrical opening, and provided with a thread portion formed on an inner surface of the cylindrical shape for engaging with a thread portion formed on an outer surface of the cylindrical opening, and capable of moving up and down while rotating around the side surface of the cylindrical opening; and an upper lid for covering an opened upper end of the cylindrical opening and sealing the cylindrical opening, wherein the cap body and the upper lid are components independent of each other so that the cap body can be rotated without rotating the upper lid, and when the cap body rotates around the side surface of the cylindrical opening to move toward the upper end of the cylindrical opening, the cap body slidably abuts on the upper lid, and pushes up the upper lid to open the cylindrical opening.

The sealing mechanism for container opening according to the present invention utilizes a force toward an upper end of the cylindrical opening exerting on an abutting surface of the upper lid which abuts on an abutting surface of the cap body, as a force for pushing up the upper lid to open the cylindrical opening (typically breaking an adhesion between the upper lid and the cylindrical opening), when the cap body rotates around the side surface of the cylindrical opening to move toward the upper end of the cylindrical opening. In this case, the cap body pushes up the upper lid while slidably rotating relative to the abutting surface of the upper lid. Therefore, even in the case that the cap body adheres to the cylindrical opening, a shear force hardly arises at the adhesion interface. Therefore, according to the present invention, it is possible to rotate the cap body with less force and open the cap easily, in comparison with a conventional cap in which an adhesion between the cap and the opening are broken by arising a shear force at the adhesion interface between the cap and the opening.

For a purpose of re-sealing the cylindrical opening with the cap, the cap body and the upper lid preferably have such construction that they engage with each other so as not to separate from each other, and when the cap body rotates around the side surface of the cylindrical opening to move toward a lower end of the cylindrical opening, the cap body abuts on the upper lid, and pulls down the upper lid to re-seal the cylindrical opening.

In view of the sealing performance relative to the cylindrical opening, the upper lid preferably adheres to an upper end surface of the cylindrical opening.

In this case, an adhesion manner between the upper lid and the upper end surface of the cylindrical opening is not limited to any special one, but in view of the sealing performance and the easy opening feature, the upper lid is preferably provided with an inner sealing element at an abutting surface relative to an upper end surface of the cylindrical opening, and the upper lid adheres to the cylindrical opening via the inner sealing element.

In the case that the sealing mechanism has a construction which an abutting surface of the cap body engages with an abutting surface of the upper lid, when the cap body rotates around the side surface of the cylindrical opening to move toward the upper end of the cylindrical opening, but does not engage at all with the abutting surface of the upper lid, when the cap body rotates around the side surface of the cylindrical opening to move toward the lower end until reaching a point where the cap body is no longer able to rotate, a force required for starting an rotation of the cap become small, and thereby the cap becomes easy to be opened.

Furthermore, a projection is preferably formed on one position on either an abutting surface of the cap body or an abutting surface of the upper lid, two abutting surfaces being adapted to abut on each other when the cap body rotates around the side surface of the cylindrical opening to move toward the upper end of the cylindrical opening. In this embodiment, a force from the cap body for pushing up the upper lid is concentrated on one point, and thereby the cap can be opened more easily.

A method of making the cap constituting the sealing mechanism for container opening according to the present invention is not limited to any special method. For example, the cap can be made by a method including: a process of integrally molding a molded product which comprises the cap body and the upper lid connected to each other via a breakable thin border portion; and a process of pushing the upper lid toward the cap body to break the thin border portion and engage the upper lid into the cap body.

Effect of the Invention

The sealing mechanism for container opening according to the present invention utilizes the movement of the cap body toward the upper end of the cylindrical opening when the cap is disengaged from the cylindrical opening, as a force for pushing up the upper lid from the cylindrical opening and thereby breaking the adhesion between the upper lid and the cylindrical opening, so that the cap is opened. In such opening action, almost no shear force arises at the adhesion interface between the upper lid and the cylindrical opening. Thereby, it is possible to easily open the container with a relatively weak force, in comparison with a conventional sealing mechanism in which the cap is opened by generating a shear force at the adhesion interface between the cap and the cylindrical opening when the cap is rotated, and thereby breaking the adhesion between the cap and the cylindrical opening.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 11 is a view for explaining an opening mechanism for opening another embodiment of the sealing mechanism for the container opening according to the present invention.

DETAILED DESCRIPTION OF THE PREFERRED EMBODIMENTS

The sealing mechanism for container opening according to the present invention is a sealing mechanism for container opening provided with: a combination of a cylindrical opening formed on a container body and a cap for sealing the cylindrical opening, wherein the cap comprises a cap body having a cylindrical shape for covering a side surface of the cylindrical opening, and provided with a thread portion formed on an inner surface of the cylindrical shape for engaging with a thread portion formed on an outer surface of the cylindrical opening, and capable of moving up and down while rotating around the side surface of the cylindrical opening; and an upper lid for covering an opened upper end of the cylindrical opening and sealing the cylindrical opening, wherein the cap body and the upper lid are components independent of each other so that the cap body can be rotated without rotating the upper lid, and when the cap body rotates around the side surface of the cylindrical opening to move toward the upper end of the cylindrical opening, the cap body slidably abuts on the upper lid, and pushes up the upper lid to open the cylindrical opening.

The sealing mechanism according to the present invention will now be discussed, with reference to FIGS. 1 to 14.

Figure 1:
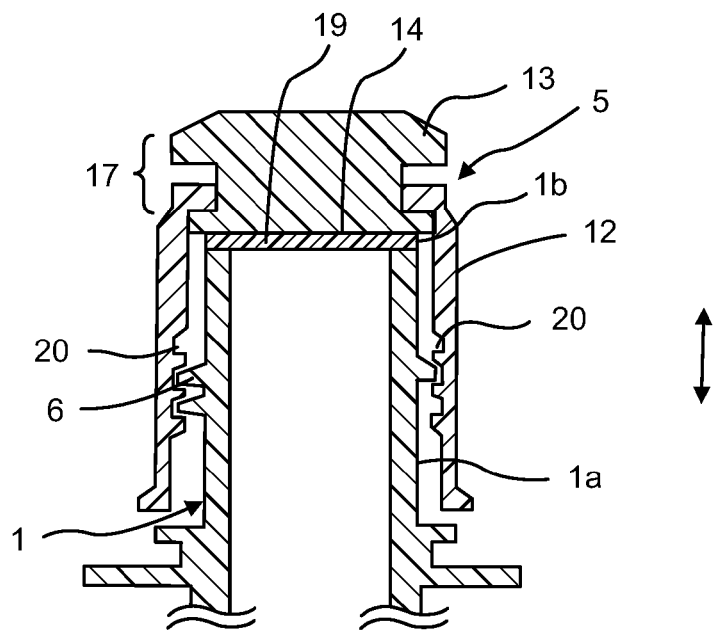
FIG. 1 is a sectional view illustrating an embodiment of the sealing mechanism for the container opening according to the present invention.
Figure 2:
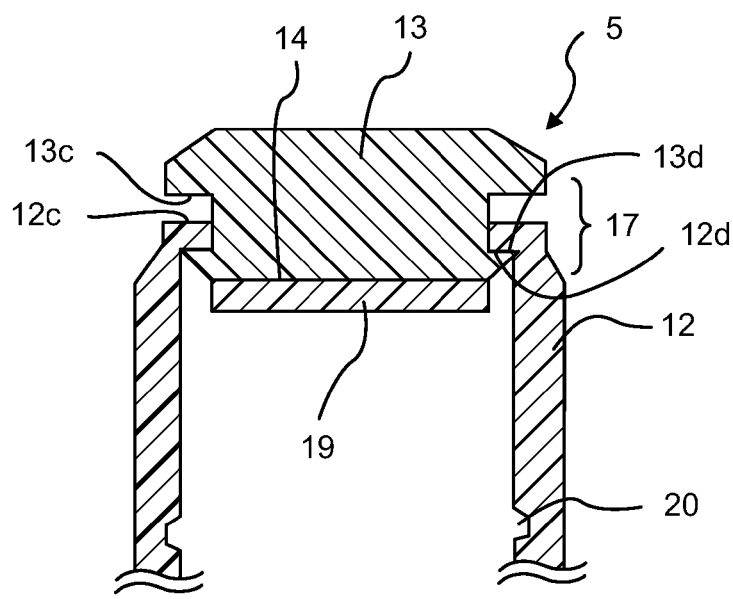
FIG. 2 is a sectional view illustrating only a cap of the sealing mechanism illustrated in FIG. 1.
Figure 3:
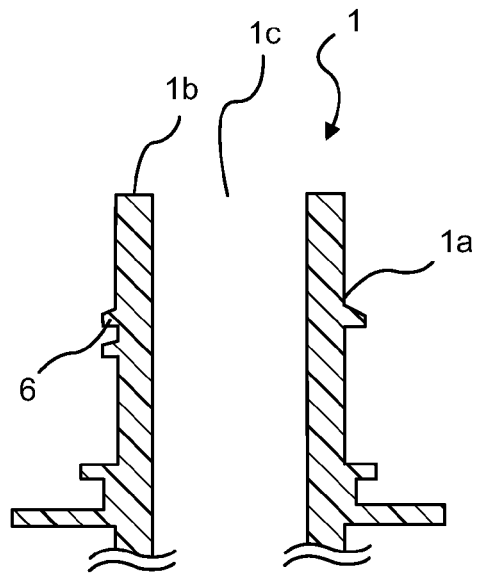
FIG. 3 is a sectional view illustrating only a cylindrical opening of the sealing mechanism illustrated in FIG. 1.
Figures 13A, 13B:
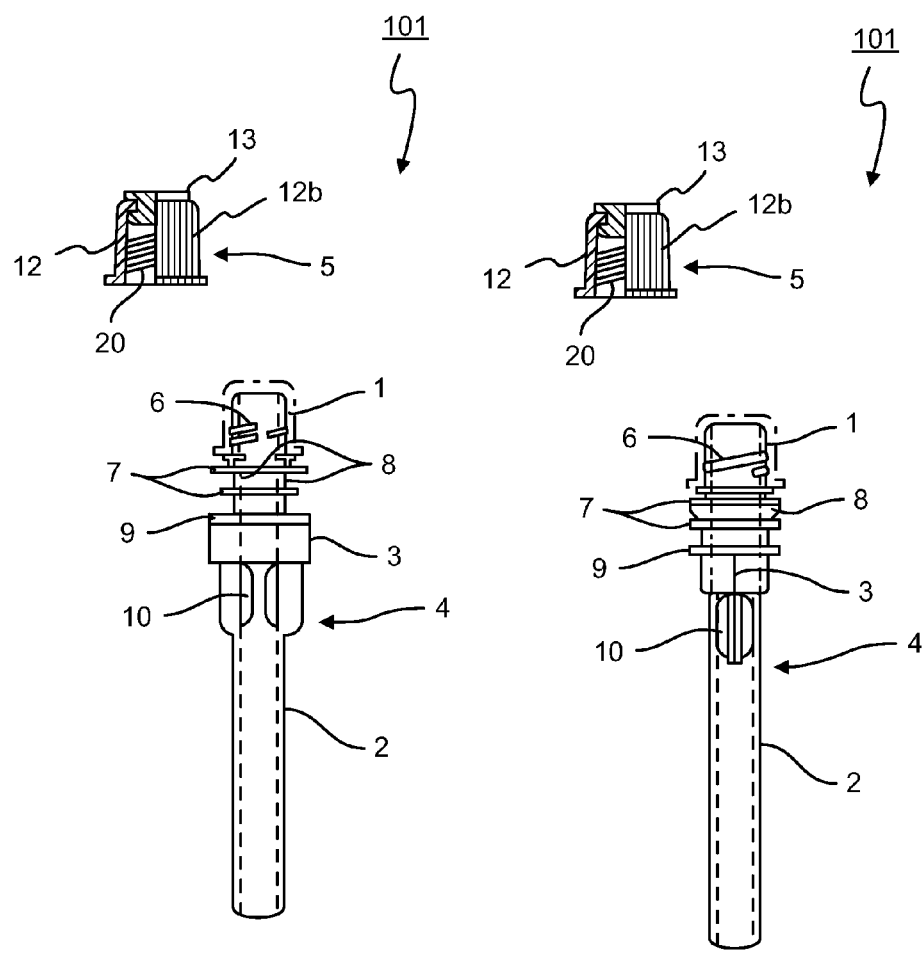
FIG. 13 is a view illustrating an embodiment of a content drawing device 101 having the sealing mechanism illustrated in FIG. 1.

FIGS. 1 to 3 illustrates a section of an embodiment of the sealing mechanism for the container opening, provided with a combination of a cylindrical opening and a cap for sealing the cylindrical opening, according to the present invention. FIG. 1 illustrates a state in which the cylindrical opening 1 is sealed with the cap 5. FIG. 2 illustrates only the cap of the sealing mechanism illustrated in FIG. 1. FIG. 3 illustrates only the cylindrical opening of the sealing mechanism illustrated in FIG. 1. Referring to FIG. 13, it illustrates a front view (13A) and a side view (13B) of an embodiment of a content drawing device 101 utilizing the sealing mechanism illustrated in FIG. 1. Furthermore, FIG. 14 illustrates an embodiment of a container to which the content drawing device 101 is attached.

Figure 14:
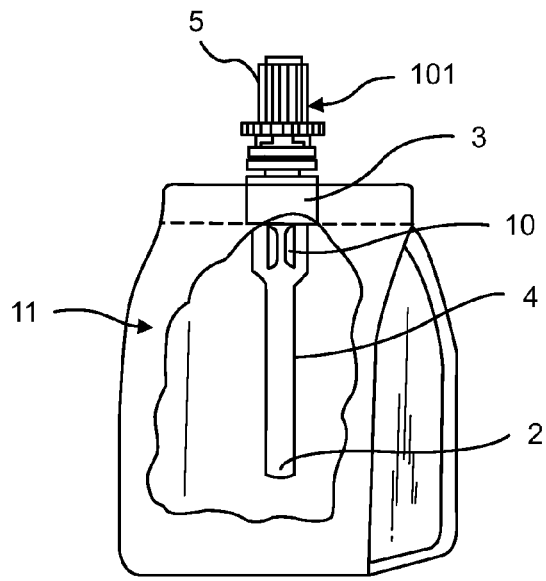
FIG. 14 is a partial cutaway illustrating an exemplary container with the content drawing device 101 illustrated in FIG. 13 attached.

The container provided with the cylindrical opening according to the present invention is not limited to the embodiment illustrated in FIG. 14. The material thereof may be paper, resin, metal, or a combination of these materials. The shape thereof is not limited to any special one, but may be tube, bottle, pouch, bag and so on. On the other hand, the cylindrical opening may be integrated with a container body or may be separate from the container body, insofar as it has a cylindrical shape and can be sealed with the cap. Furthermore, the cylindrical opening may have not only a structure to be attached to the content drawing device illustrated in FIG. 13, but also a structure of a pouring or injection opening to be attached to a general tube or bottle.

In FIG. 13, the content drawing device 101 is provided with: a straw portion 4 including at least the cylindrical opening 1, a conduit portion 2, a joint portion 3 extending symmetrically relative to the center axis of the conduit portion 2 at an upper end of the conduit portion 2; and the cap 5 for sealing the cylindrical opening 5. As shown in FIG. 1 and FIG. 3, the cylindrical opening 1 has a thread portion 6 (external thread in this embodiment) at the side surface 1a for engaging with a thread portion 20 (internal thread in this embodiment) of the cap 5 (the cap body 12). Thereby, the cylindrical opening 1 is sealed by engaging with the cap 5. In a state that the container is not opened yet, an upper end surface 1b of the cylindrical opening 1 adheres to a disc portion of the cap 5 (i.e. an upper lid 13) via an inner sealing element 19 and thereby an opened upper end 1c of the cylindrical opening 1 is sealed tightly.

The straw portion 4 is usually made of a plastic material such as polyethylene (e.g. HDPE) or polypropylene, via an injection molding, in view of adhesiveness relative to the upper lid 13 and the inner sealing element 19. Nevertheless, the material is not limited. For example, materials other than plastics may be used to form the straw portion 4.

Suspending flanges 7 may be provided for the cylindrical opening 1, in order to suspend the content drawing device 101 during a process for manufacturing the container. Alignment ribs 8 may be provided for the cylindrical opening 1, in order to align the content drawing device 101 suspended via the suspending flanges 7. Furthermore, an upper end flange 9 or a content passage holes (delivery cavities) 10 for drawing or filling the content efficiently may be provided for the conduit portion 2.

As shown in FIG. 14, for example, the content drawing device 101 can be utilized by joining the joint portion 3 of the content drawing device 101 with an upper opening of the container body 11 which is a gusset bag made of flexible laminated films. In order to draw the content from the container, the cap 5 is opened by disengaging the cap 5 from the cylindrical opening 1, and the cylindrical opening 1 is used as an outlet. In the case that a tip of the conduit portion 2 reaches the vicinity of a bottom of the container body 11, as shown in FIG. 14, the content drawing device 101 can be used as a straw for sucking up the content with mouth contacting the cylindrical opening 1.

As shown in FIGS. 1 and 2, the cap 5, which engages with the cylindrical opening 1 for sealing the cylindrical opening 1, is provided with: a cap body 12; and an upper lid 13.

The cap body 12 has a cylindrical shape for covering the side surface 1a of the cylindrical opening 1, and has a thread portion 20 inside of the cylindrical shape for engaging with the thread portion 6 of the cylindrical opening 1. By engaging with the cylindrical opening 1, the cap body 12 can moves up and down (the directions indicated by an arrow in FIG. 1) while rotating around the side surface 1a of the cylindrical opening 1. Thus, the cap body 12 is adapted to be attached to and peeled off from the cylindrical opening 1 freely.

On the other hand, the upper lid 13 is for covering the opened upper end 1c (shown in FIG. 3) of the cylindrical opening 1 so as to close the cylindrical opening 1.

The cap body 12 and the upper lid 13, which constitute the cap 5, are components independent of each other. That is, the cap body 12 can be rotated without rotating the upper lid 13. When the cap body 12 moves toward the upper end (upper end surface) of the cylindrical opening 1, while rotating around the side surface 1a of the cylindrical opening 1, the cap body 12 will contact with the upper lid 13 at each abutting surface 12c, 13c. If the cap body 12 further moves toward the upper end of the cylindrical opening 1 after contacting with the upper lid, the upper lid 13 is pushed up.

By this "pushing up" effect of the cap body 12 on the upper lid 13, the upper lid 13 is detached from the opened upper end 1c of the cylindrical opening 1, so that the cylindrical opening 1 is opened. In this regard, in the case that the upper lid 13 adheres to the upper end surface 1b of the cylindrical opening 1, the upper lid 13 is peeled off from the upper end surface 1b of the cylindrical opening 1 due to the force from the cap body 12 for pushing up the upper lid 13. Thus, the cylindrical opening and thereby the container is opened (see FIG. 10 and FIG. 11).

In this opening operation, since the cap body 12 has a structure freely rotatable relative to the upper lid 13, the cap body 12 can rotate around the axis of the cylindrical opening 1 while sliding relative to the abutting surface of the upper lid 13, even after the cap body 12 contacts with the upper lid 13. Thereby, the cap body 12 can move toward the upper end of the cylindrical opening to push up the upper lid 13.

Therefore, even in the case that the upper lid 13 adheres to the cylindrical opening 1, almost no shear force arises at the adhesion interface between the upper lid 13 and the cylindrical opening 1, because the cap body 12 rotates while sliding along the abutting surface of the upper lid 13 when the cap body 12 pushes up the upper lid 13 as mentioned above. Thereby, it is possible to rotate the cap body 12 with a less force, because there is less resistance in the shear direction in comparison with Japanese examined Utility Model Application Publication No. S49-26614 and Japanese Patent Application Laid-Open No. 2004-83080. Then, by the rotation of the cap body 12, the upper lid 13 is pushed up in a direction vertical to the adhesion interface between the cylindrical opening 1 and the upper lid 13, so that the upper lid 13 can be peeled off from the cylindrical opening 1 without generating a shear force at the adhesion interface.

As described above, the sealing mechanism of the container opening according to the present invention utilizes a force toward the upper end of the cylindrical opening exerting on the abutting surfaces at which the cap body and the upper lid abut on each other, as a force for pushing up the upper lid to open the cylindrical opening (typically, breaking the adhesion between the upper lid and the cylindrical opening), while the cap body rotates around the side surface of the cylindrical opening to move toward the upper end of the cylindrical opening.

It is possible to open the cap easily, because a less force is required for detaching the upper lid adhering to the upper end surface of the cylindrical opening from the cylindrical opening in a direction vertical to the adhesion interface between the upper lid and the cylindrical opening, in comparison with a force required for detaching the cap from the opening due to the shear force generated at the adhesion interface between the cap and the opening by the rotation of the cap.

In other words, according to the present invention, it is possible to seal the cylindrical opening tightly with a great adhesion force which would made "to open the cap" hard in the case of the conventional container utilizing the shear force to open it. Therefore, it is possible to provide a container having a higher sealing performance than the conventional container. Alternatively, it is possible to provide an "easy opening" container capable of being opened with a less force while a sealing performance in an unopened state is maintained.

In the present invention, the state in which "the upper lid closes/seals the cylindrical opening" includes not only "the state in which the upper lid for covering the opened upper end of the cylindrical opening adheres to the cylindrical opening", but also "the state in which the upper lid is fixed to the opened upper end of the cylindrical opening by other means without adhesion". For example, it includes "a state in which an upper lid made of a highly fittable material such as rubber is tightly attached to the opened upper end so as to surround the outer circumference of the upper end surface by the highly fittable material and thereby seal the cylindrical opening".

Relating to the expression "the cap body and the upper lid are components independent of each other", the cap body 12 may be completely separated from the upper lid 13 (see FIGS. 4, 5 and 8) insofar as the cap body can be rotated without rotating the upper lid 13, or the cap body 12 may be connected with the upper lid so that the cap body 12 can rotate freely relative to the upper lid 13 (see FIGS. 1, 2, 6, 7 and 9).

In the embodiment illustrated in FIGS. 1 to 3, the upper lid 13 and the cylindrical opening 1 are allowed to adhere to each other via the inner sealing element 19 disposed on an abutting surface 14 of the upper lid 13 which otherwise abuts on the opened upper end 1c of the cylindrical opening 1. The adhesion between the upper lid and the cylindrical opening in an unopened state of the container is not limited to any special manner, insofar as it can maintain the sealing performance of the unopened state, and the upper lid can be peeled off from the cylindrical opening by pushing up the upper lid via the cap body. For example, the upper lid may be directly fused to the upper end surface of the cylindrical opening, or may be bonded to the upper end surface of the cylindrical opening via an adhesive or bond. From the viewpoint of securing the sealing performance in the unopened state and the "easy opening" feature when the cap is opened, it is preferable that the upper lid adheres to the cylindrical opening via the inner sealing element disposed on the abutting surface of the upper lid which otherwise abuts on the cylindrical opening.

As the inner sealing element, it is possible to use a material which can cover the opened upper end of the cylindrical opening, and maintain the sealing performance by making the abutting surface of the upper lid adhere to the upper end surface of the cylindrical opening in the unopened state, and which has an adhesiveness allowing the easy detachment from the upper end surface of the cylindrical opening, but preventing the detachment from the upper lid, when the cap is opened. By using such an inner sealing element via which the upper lid is made to adhere to the cylindrical opening, it is possible to maintain the sealing performance around the cylindrical opening in the unopened state, and open the cap with a less force, and at the same time, detach the inner sealing element from the cylindrical opening.

In this regard, in order to ensure the detachment of the inner sealing element from the cylindrical opening 1 at the same time when the cap is opened, an adhesive strength per unit area or unit length between the inner sealing element and the upper lid is preferably greater than an adhesive strength per unit area or unit length between the inner sealing element and the cylindrical opening.

Nevertheless, even in the case that the adhesive strength per unit area or unit length between the inner sealing element and the upper lid is equal to or less than the adhesive strength per unit area or unit length between the inner sealing element and the cylindrical opening, the inner sealing element usually strongly adheres to the upper lids rather than the cylindrical opening. Because, the adhesion area between the upper lid and the inner sealing element is much greater than the adhesion area between the cylindrical opening and the inner sealing element, if the inner sealing element has a shape capable of covering the entire area of the opened upper end and adheres to the upper lid with its entire area. Therefore, even in these cases, the inner sealing element can be surely peeled off from the cylindrical opening at the same time when the cap is opened.

If it is difficult to measure directly the adhesive strength per unit area or unit length between the inner sealing element and the upper lid, or between the inner sealing element and the cylindrical opening, it is possible to measure an adhesive strength per unit area or unit length between a plate made of an inner sealing element material and a plate made of a cylindrical opening material, or between a plate made of an inner sealing element material and a plate made of an upper lid material, and use these measured strength as the adhesive strength per unit area or unit length between the inner sealing element and the upper lid, or between the inner sealing element and the cylindrical opening, respectively.

A method of measuring the adhesive strength per unit length between the plate made of the inner sealing element material and the plate made of the upper lid material, or between the plate made of the inner sealing element material and the plate made of the cylindrical opening material may be a method described in JIS Z0238 "a method of testing heat sealed soft pouches and semi-rigid containers".

Various materials can be used as the inner sealing element material. For example, a composite plastic film comprising a single plastic film layer or a plurality of plastic film layers and optionally containing one or more metal film layers, one or more inorganic deposited film layers, one or more paper layers and so on can be used. Typically, a composite film is used, which is provided with: a plastic film layer (a front side outer layer) for fusibly bonding to the upper lid; an intermediate layer comprising a plastic layer, a metal film layer or an inorganic deposited layer, or a laminated film or the like containing these layers; and a heat seal layer (a rear side outer layer) for fusibly bonding to the cylindrical opening.

The heat seal layer may be a single layer or may be multiple layers obtained by laminating a plurality of layers, insofar as it can fusibly bond with the cylindrical opening 1. Also, the material of the heat seal layer is not to be limited to any special material, but it is preferable to employ an "easy peel film" having an easy peelability. A manner of peeling of the easy peel film is not limited to any special manner, but may be interfacial peeling, cohesion peeling, interlayer peeling and so on, which can be selected in view of a container shape, sealing condition, sterilization condition or the like. The easy peel film of an interfacial peeling type may be a laminated film provided with: a supporting layer made of polyethylene (PE) film; and a adhesion layer made of ethylene vinyl acetate copolymer (EVA) and an adhesive. The easy peel film of a cohesion peeling type may be a laminated film provided with: a supporting layer made of PE film or polypropylene (PP) film; and a cohesion peelable layer made of PP, PE and optionally other materials.

In the case that a container provided with the sealing mechanism of the container opening according to the present invention is used as a retort pouch, it is preferable that the manner of peeling of the easy peel film is a cohesion peeling or a interlayer peeling, especially the cohesion peeling. It is preferable that the easy peel film of a cohesion peeling type for retort pouch has a laminated structure provided with: for example, a supporting layer made of PP film having a good heat resistance; and a cohesion peelable layer made of PP, PE and optionally other materials.

On the other hand, the plastic film layer may be a single layer or multiple layers obtained by laminating a plurality of layers, insofar as it can fusibly bond with the abutting surface 14 of the upper lid 13. For example, it may be a non-oriented film layer such as linear low density polyethylene (LLDPE), non-oriented polypropylene (CPP), low density polyethylene (LDPE), or ethylene vinyl acetate copolymer (EVA), or may be a laminated film of these films. As in the case of the heat seal layer, in the case that a container provided with the sealing mechanism according to the present invention is used as a retort pouch, it is preferable to use a polypropylene-based film such as a heat resistant CPP.

As the intermediate layer, there may be used: an oriented film layer such as oriented polyethylene terephthalate (OPET), oriented polypropylene (OPP), oriented high density polyethylene (HDPE), or oriented nylon (ONY); or a metal layer made of metal deposition layer or metal film layer such as aluminum (Al). Furthermore, a laminated layer obtained by laminating a plurality of these layers may be used as the intermediate layer. In the case that the metal layer made of the metal deposition layer or the metal film layer such as aluminum (Al) is used as the intermediate layer, the metal layer can be heated by electromagnetic induction to fusibly bond the heat seal layer with the upper end surface of the cylindrical opening and/or fusibly bond the plastic film layer with the upper lid. From the viewpoint mentioned above, the intermediate layer preferably includes a metal layer. Furthermore, any optional layer capable of providing some function, for example, a gas barrier effect or the like can be provided as the intermediate layer, if needed.

A specific example of the inner sealing element is "Plastic film layer [CPP 30-50 μm]/Intermediate layer [Al 6-30 μm]/Heat seal layer [easy peel film 25-50 μm]". However, this specific example is not exclusive.

A method of bonding the inner sealing element with the abutting surface of the upper lid and the upper end surface of the cylindrical opening to seal the cylindrical opening is not limited to any special method. For example, it is possible that the inner sealing element is set at a place to be the abutting surface in the mold for the upper lid when the upper lid is molded, and the molten plastic material is injected into the mold to fill inside the mold, and then cooled and cured in the mold, so that the inner sealing element and the upper lid is bonded and integrated as a unit (insert-injection molding).

Alternatively, after molding the upper lid, or after molding the cap in which the cap body engages with the upper lid, the inner sealing element can be set at a place on the upper lid to be the abutting surface relative to the cylindrical opening and then fusibly bonded to the upper lid by a conventional method utilizing heat seal, high frequency, ultrasonic, electromagnetic induction and so on.

The inner sealing element and the upper end surface of the cylindrical opening can be fusibly bonded to each other by (i) completely engaging the cap, which is provided with the upper lid to which the inner sealing element is made to adhere as mentioned above, with the cylindrical opening attached to the container, and (ii) applying high frequency or ultrasonic to the cap completely engaged with the opening.

Alternatively, it is possible that the cap is engaged with the cylindrical opening in the state that the inner sealing element is set at the upper end surface of the cylindrical opening attached to the container, and then high frequency or ultrasonic is applied to them so that the inner sealing element is fusibly bonded with both the upper end surface of the cylindrical opening and the upper lid at the same time.

A specific structure of the cap body and a specific structure of the upper lid, as constitutional components of the cap, are not limited to any special structure, insofar as they are independent component of each other, in which the cap body can be rotated without rotating the upper lid, and the cylindrical opening is opened by the cap body which slidably abuts on the upper lid and pushes up the upper lid while rotating around the side surface of the cylindrical opening to move toward the upper end surface of the cylindrical opening.

That is, it is sufficient that the cap body 12 has a cylindrical shape for covering the side surface 1a of the cylindrical opening 1, and is provided with: a thread portion 20 for engaging with the cylindrical opening 1; and an abutting surface 12c for slidably abutting on the upper lid 13 and pushing up the upper lid 13, while rotating around the side surface 1a of the cylindrical opening to move toward the upper end surface of the cylindrical opening 1. On the other hand, it is sufficient that the upper lid 13 can close the cylindrical opening 1 by covering the opened upper end 1c of the cylindrical opening 1, and is provided with an abutting surface 13c which slidably abuts on the cap body 12 and allows the upper lid 13 to be pushed up, while the cap body rotates around the side surface 1a of the cylindrical opening 1 to move toward the upper end surface of the cylindrical opening 1.

Figure 4:
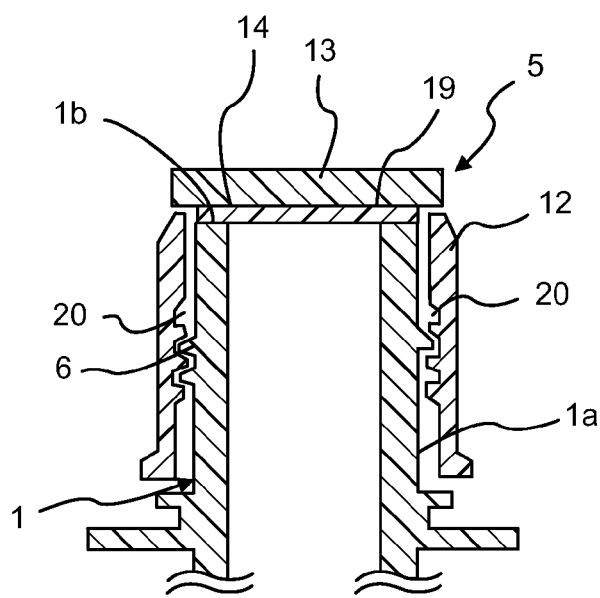
FIG. 4 is a sectional view illustrating another embodiment of the sealing mechanism for the container opening according to the present invention.
Figure 5:
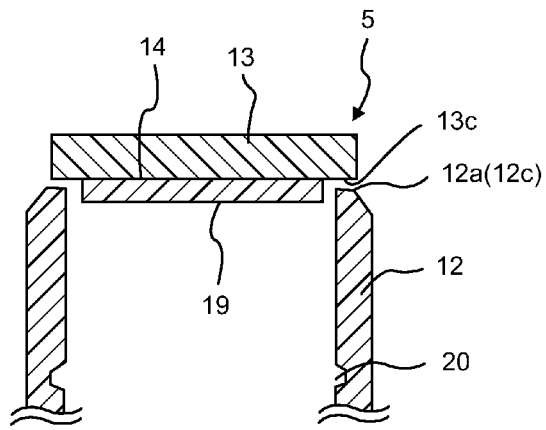
FIG. 5 is a sectional view illustrating only a cap of the sealing mechanism illustrated in FIG. 4.

A specific structure of the cap 5 may be a structure illustrated in FIGS. 4 and 5, instead of a structure illustrated in FIGS. 1 and 2. In an example of FIGS. 4 and 5, a cap 5 is provided with: an upper lid 13 having a disc like shape having a diameter greater than an outer diameter of the cylindrical opening 1; and a cap body 12 having a cylindrical shape inside of which a thread portion 20 is formed. The cap 5 shown in FIGS. 4 and 5 is adapted so that a central portion of the disc like upper lid 13 covers an opened upper end 1c of the cylindrical opening 1, and a circumference of the disc like upper lid 13 abuts on an upper end surface 12a (also acts as an abutting surface 12c) of the cap body 12 where the upper lid 13 is pushed up.

Figure 8:
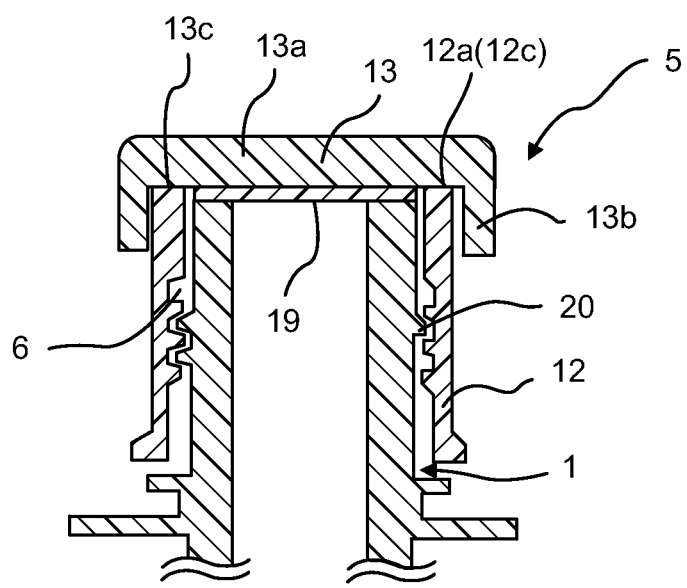
FIG. 8 is a sectional view illustrating another embodiment of the sealing mechanism for the container opening according to the present invention.

It is also possible to use a cap 5, as shown in FIG. 8, provided with: a cap body 12 having a cylindrical shape inside of which a thread portion 20 is formed; and a upper lid 13 having a skirt portion 13b. The upper lid 13 illustrated in FIG. 8 has: a disc portion 13a for covering the cylindrical opening 1 and abutting on the upper end surface 12a of the cap body 12; and a skirt portion 13b extending from the circumference of the disc portion 13a and having an inner diameter greater than an outer diameter of the cap body 12. The upper lid 13 abuts on the cap body 12 at the disc portion 13a surrounded by the skirt portion 13b. In FIG. 8, since the cap 5 is adapted so that the upper end surface 12a of the cap body 12 is covered by the skirt portion 13b of the upper lid 13, less dust enters a gap between the cap 5 and the cylindrical opening 1, in comparison with the cap illustrated in FIG. 4.

As shown in FIGS. 1 and 2, or FIGS. 6 and 7, it is possible to form a convex or concave portion to be an abutting surface 12c relative to the upper lid 13 at an inside or outside surface of the cap body 12, so that the cap body 12 and the upper lid 13 abuts on each other at this concave or convex portion. It is also possible to form vertical grooves 12b or the like at an outer side surface of the cap body 12 for an anti-slip purpose (see FIG. 13).

The cap body 12 and the upper lid 13 preferably engage with each other so as not to separate from each other, as shown in FIGS. 1 and 2, so that the cylindrical opening 1 is closed again by the cap 5, even after the adhesion between the upper lid 13 and the cylindrical opening 1 are once broken. The cap 5 preferably has a structure allowing to re-seal the cylindrical opening 1 by abutting another abutting surface 12d of the cap body 12 on another abutting surface 13d of the upper lid 13 and thereby pulling down the upper lid 13 with the cap body 12, when the cap body 12 rotates around the side surface of the cylindrical opening to move down (in a direction opposite to the upper end surface 1b side).

Referring to FIGS. 1 and 2, the cap body 12 and the upper lid 13 have their respective abutting surface 12d, 13d where the cap body 12 abuts on the upper lid when the cap body 12 rotates around the side surface of the cylindrical opening to move down, as well as their respective abutting surface 12c, 13c where the cap body 12 abuts on the upper lid when the cap body rotates around the side surface of the cylindrical opening 1 to move up. The cap body 12 and the upper lid 13 engage with each other at this engage portion 17 providing these abutting surfaces 12c, 13c and abutting surfaces 12d, 13d. Thereby, the cap body 12 can be connected with the upper lid 13, even after the upper lid 13 is once peeled off from the cylindrical opening 1.

When the cap body 12 moves down while rotating around the side surface 1a of the cylindrical opening 1, the cap body 12 abuts on the upper lid 13 at their respective abutting surface 12d, 13d. As the cap body 12 further moves down, the upper lid 13 is pulled down. Consequently, the upper lid 13 abuts on the upper end surface 1b of the cylindrical opening 1 again, and thereby re-seals the cylindrical opening 1.

The engagement between the cap body and the upper lid is as loose as the cap body can rotates freely relative to the upper lid and the rotation of the cap body around the cylindrical opening is not restricted.

Figure 6:
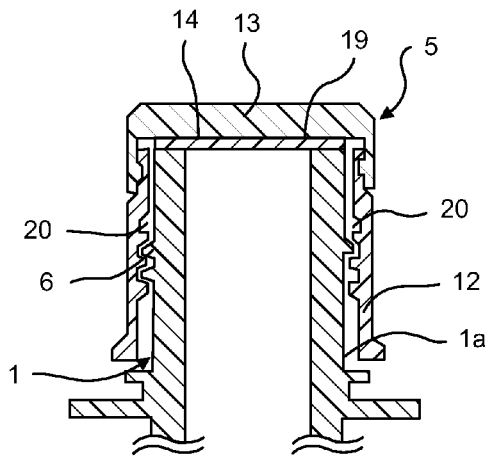
FIG. 6 is a sectional view illustrating another embodiment of the sealing mechanism for the container opening according to the present invention.
Figure 7:
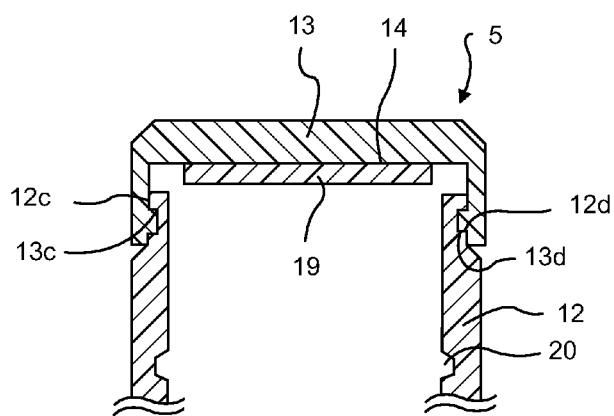
FIG. 7 is a sectional view illustrating only a cap of the sealing mechanism illustrated in FIG. 6.

The engagement manner between the cap body and the upper lid is not limited to any special one. For example, it may be a manner that the upper lid 13 engages with the inside of the cap body 12 as shown in FIGS. 1 and 2, or may be a manner that the upper lid 13 engages with the outside of the cap body 12 as shown in FIGS. 6 and 7.

Figure 9:
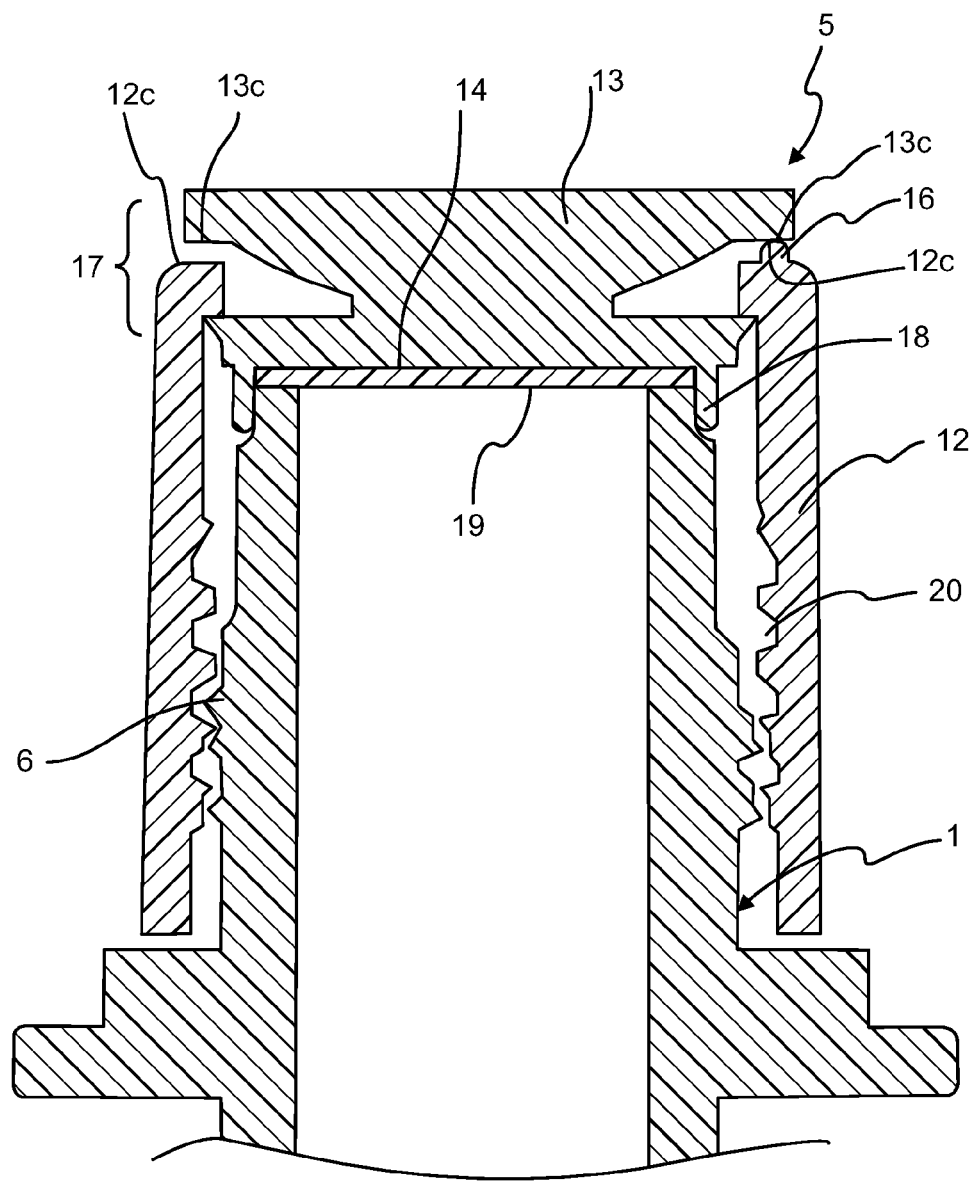
FIG. 9 is a sectional view illustrating another embodiment of the sealing mechanism for the container opening according to the present invention.

In order to improve the sealing performance of the re-sealing, a packing 18 is preferably provided. The packing 18 may have any structure insofar as it can improve the sealing performance of the cylindrical opening 1. For example, an outer packing can be used, as shown in FIG. 9, which is formed on the abutting surface 14 of the upper lid 13 and has a cylindrical shape having an inner diameter slightly smaller than an outer diameter of the cylindrical opening 1 and slightly greater than an inner diameter of the cylindrical opening 1, so as to contact tightly with the outer circumferential surface of the cylindrical opening 1. The inner circumferential surface of such a packing 18 can contact tightly with the outer circumferential surface of the cylindrical opening 1, by engaging the cap 5 with the cylindrical opening 1.

Alternatively, an inner packing can be used also (although not shown), which is formed on the abutting surface 14 of the upper lid 13 and has a cylindrical shape having an outer diameter slightly greater than an inner diameter of the cylindrical opening 1, so as to be in contact tightly with the inner circumferential surface of the cylindrical opening 1. The outer circumferential surface of such a packing can enter into the inside of the cylindrical opening and be in contact tightly with the inner circumferential surface of the cylindrical opening 1, by engaging the cap 5 with the cylindrical opening 1.

Alternatively, it is possible to use a packing (although not shown) in which both the inner packing and the outer packing are combined so that the packing can be in contact tightly with the inner circumferential surface and the outer circumferential surface of the cylindrical opening and thereby seal the cylindrical opening.

Among the above packings, the outer packing is preferable, in view of easiness in attaching the inner sealing element to the upper lid, and simplicity of the inner sealing element structure and the packing structure.

The packing can be provided, regardless of using the inner sealing element.

The cap 5 is preferably adapted so that the abutting surfaces 12c, 13c, abut on each other, when the cap body 12 rotates around the side surface 1a of the cylindrical opening 1 to move toward the upper end of the cylindrical opening, but form a gap that the surfaces 12c, 13c are not in contact with each other at all, when the cap body 12 rotates around the side surface 1a of the cylindrical opening 1 to reach a lowest position relative to the cylindrical opening, as shown in FIGS. 1 and 2.

Thus, in a condition that the cap body 12 is at a lowest position relative to the cylindrical opening 1, in other words, in a condition that the cap body 12 fully engages with the cylindrical opening 1 and is no longer able to rotate around the side surface of the cylindrical opening 1, if there is provided with a gap between the abutting surface 12c of the cap body 12 and the abutting surface 13c of the upper lid 13, a force for pushing up the upper lid 13 is not required when the rotation of the cap body 12 is started to move up the cap body 12, because the cap body 12 does not engage with the upper lid 13. Therefore, a force for starting the rotation of the cap body 12 is only required, when the rotation of the cap body 12 is started (see FIG. 10A).

A force required for rotating one member relative to another member which engage with each other is usually strongest, when the rotation is started in an open direction from a fully-engaged condition, because of some reason such as the wall thickness of the external thread. Therefore, if a force is required for pushing up the upper lid 13 which engages with the cap body 12 when the rotation of the cap body is started (see FIGS. 6 and 7), a relatively strong force is required for starting the rotation of the cap body 12. On the contrary, if only a force for disengaging the cap body 12 from the cylindrical opening 1 is required when the rotation of the cap body 12 is started, the rotation of the cap body 12 can be started with a relatively weak force.

Figure 10A:
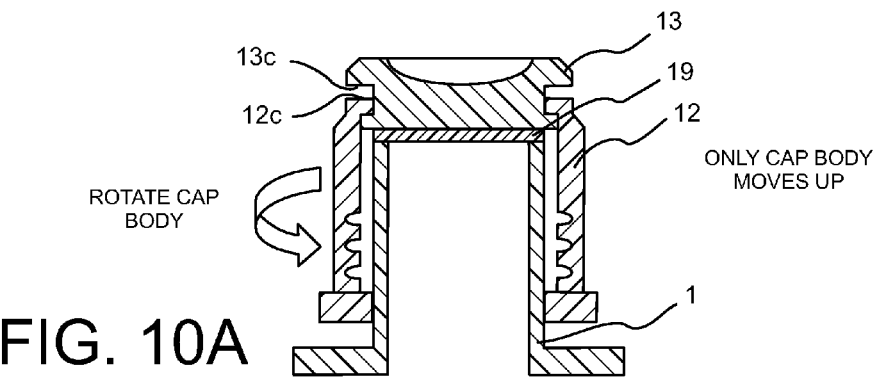
FIG. 10 is a view for explaining an opening mechanism for opening an embodiment of the sealing mechanism for the container opening according to the present invention.
Figure 10B:
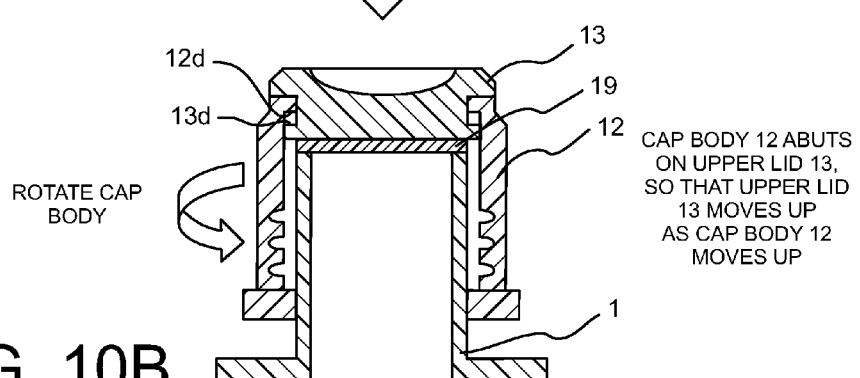

After the time when the abutting surface 12c of the cap body 12 abuts on the abutting surface 13c of the upper lid 13 by rotating the cap body 12 around the side surface 1a of the cylindrical opening 1 to move toward the upper end of the cylindrical opening 1, a force for pushing up the upper lid 13 is further required in addition to the force for rotating the cap body 12 (see FIG. 10B). At this stage, a force required for rotating the cap body 12 in order to disengage the cap body 12 from the cylindrical opening 1 is smaller than a force required when the rotation of the cap body 12 is started. Thereby, it is possible to continue rotating the cap body 12 with a relatively small force to success and pushing up the upper lid 13.

In particular, even in the case that the upper lid 13 adheres to the cylindrical opening 1, and a force for breaking the adhesion between the upper lid and the cylindrical opening is also required when the upper lid 13 is pushed up, it is possible to open the cap easily with a relatively small force, by providing the gap as mentioned above between the abutting surfaces 12c and 13c.

Such a structure having a gap between the abutting surface 12c of the cap body 12 and the abutting surface 13c of the upper lid 13, when the cap body 12 rotates around the side surface 1a of the cylindrical opening 1 until it reaches the lowest end relative to the cylindrical opening 1 may be illustrated also in FIGS. 4 and 5, in addition to FIGS. 1 and 2.

It is possible that an expandable member (not shown) is inserted at a gap between the abutting surface 12c and the abutting surface 13c so as to contact with both abutting surfaces 12c, 13c, so that the dust is prevented from entering between the cap and the cylindrical opening while allowing to rotate the cap body with a weak force on starting the rotation. The expandable member is sufficiently adapted to be retracted between the abutting surfaces 12c, 13c when the cap body moves toward the upper end of the cylindrical opening 1 so as to ensure the same effect as in the case that the gap is provided between the abutting surfaces 12c, 13c, and to be recovered to its original shape when the cap body 12 moves toward the lower end of the cylindrical opening 1. For example, the expandable member may be an elastic member such as rubber or a ring-like member having an accordion shape.

Figure 10C:
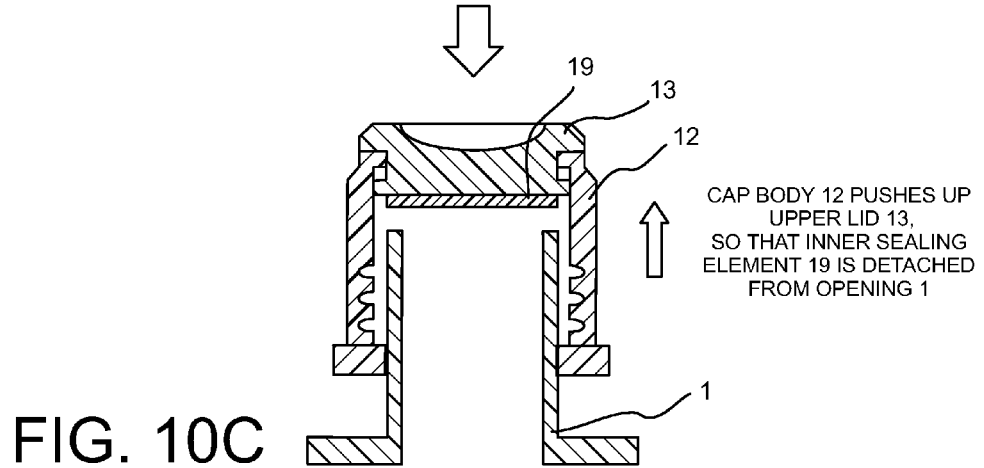

As shown in FIG. 11, in an embodiment that the abutting surfaces 12c, 13c abuts on each other in a state that the cap body 12 is at the lowest position relative to the cylindrical opening 1, it is not possible to start the rotation of the cap body with a force as weak as in the embodiment shown in FIG. 10, because a force for pushing up the upper lid is required in addition to a force for starting the rotation of the cap body on starting the rotation. Nevertheless, even in this case, it is possible to open the cap with a force sufficiently smaller than a force required for opening a conventional cap.

Embodiments that the abutting surfaces 12c, 13c abut on each other in a state that the cap body 12 is at the lowest position relative to the cylindrical opening 1 may be not only illustrated in FIG. 11, but also illustrated FIGS. 6 and 7, and FIG. 8.

The engagement manner between the cap body 12 and the upper lid 13 at their respective abutting surface 12c, 13c is not limited to any special manner, but the following manner is preferable, because a force from the cap body 12 for pushing up the upper lid 13 is focused on one point, and the upper lid 13 becomes easy to be peeled off from the cylindrical opening 1. That is, a projection (convex point) 16 is provided at one position on either the abutting surface 12c or the abutting surface 13c where the cap body 12 and the upper lid 13 face each other when the cap body 12 moves up while rotating around the side surface 1a of the cylindrical opening 1 (see FIG. 9).

Thus, in the case that the projection 16 is provided at one position on either the abutting surface 12c or the abutting surface 13c, the upper lid 13 is lifted up by a distance corresponding to a height of the projection at a position where the projection 16 is formed. As a result, the upper lid 13 is tilted as a whole. The adhesion interface between the upper lid 13 and the cylindrical opening 1 at the position where the projection 16 is formed becomes a start point for peeling the upper lid 13 from the cylindrical opening 1, because a force for pulling up the upper lid 13 from the cylindrical opening 1 is focused thereon. Such a force for pulling up a part of the adhesion interface is smaller than a force required for peeling an entire area of the adhesion interface at once. Furthermore, it promotes to peel the remain area of the adhesion interface, because a stress is concentrated on the peel starting point generated on the adhesion interface. Therefore, it is possible to peel off the upper lid 13 from the cylindrical opening 1 easily.

In the case that the projection 16 is formed on the abutting surface 12c of the cap body 12, as shown in FIG. 9, the projection 16 comes into contact with and pushes up the upper lid 13, while the projection 16 rotates as the cap body 12 rotates around the cylindrical opening 1. Therefore, a force for peeling the upper lid 13 from the cylindrical opening 1 is applied little by little on the adhesion interface between the upper lid 13 and the cylindrical opening 1.

On the other hand, in the case that the projection 16 is formed on the abutting surface 13c of the upper lid 13, the projection 16 does not rotate even if the cap body 12 rotates around the cylindrical opening 1, and thereby lifts up the upper lid 13 intensively at the position where the projection 16 is formed, until the upper lid 13 is detached from the cylindrical opening 1.

A travel distance of the cap body in a vertical direction per one rotation of the cap body depends on a pitch of the thread portion disposed on the cap body and the cylindrical opening Therefore, it is possible to control a force required for pushing up the upper lid by controlling the pitch of the thread portion. That is, if the pitch of the thread portion becomes narrow and thereby the travel distance of the cap body in the vertical direction per one rotation becomes short, the cap can be rotated with a small force. As a result, opening the cap becomes easy.

Figures 12A, 12B:
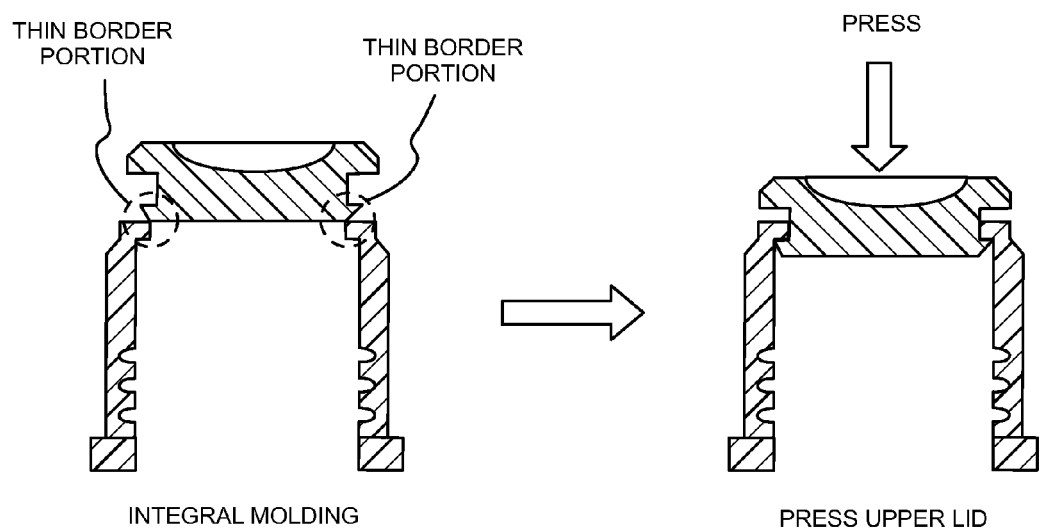
FIG. 12 is a view for explaining an example of a method for making a cap as a component of the sealing mechanism for the container opening according to the present invention.

A method of producing the cap constituting the sealing mechanism according to the present invention is not limited to any special method. For example, the cap body and the upper lid can be molded independently of each other, and then they can be assembled (engaged with each other). Alternatively, as shown in FIG. 12, the cap body 12 and the upper lid 13 can be integrally molded with a breakable thin border part where the cap body 12 and the upper lid 13 are breakably connected. Then, the upper lid 13 integrally molded with the cap body 12 can be pressed toward the cap body 12, so that the thin border part is broken to engage the upper lid 13 with the cap body 12.

If there is a need to form the cap body and the upper lid from different materials, it is possible that they are molded independently of each other. If the cap body and the upper lid are to be formed from the same material, they are preferably integrally molded, in view of the simplicity in assembling the cap body and the upper lid.

The material for forming the cap body can be suitably selected from various materials which have rigidity for preventing a remarkable deformation due to a force applied on the cap body when the cap is opened. For example, polyethylene such as HDPE, polypropylene or the like can be used.

On the other hand, the material for forming the upper lid can be suitably selected from various materials which have strength for maintaining the cylindrical opening in a sealed state. Furthermore, in the case that the upper lid is made to adhere to the cylindrical opening via the inner sealing element, the upper lid material is preferably selected from materials which can be fusibly bonded with the inner sealing element. Alternatively, in the case that the upper lid is made to adhere directly to the cylindrical opening 1, the upper lid material is preferably selected from materials which can be fusibly bonded with the cylindrical opening 1. For example, polyethylene such as HDPE, polypropylene or the like can be used.

In the case that the cap is used as a cap for a container to be retort-sterilized (e.g. retort pouch), a heat resistant material such as polypropylene is preferably used as for making the cap body and the upper lid.

(Modified Embodiments)

In such a retort treatment of the container provided with the sealing mechanism according to the present invention, there may be a case that water remains in a space existing at the abutting portion of the cap body and the upper lid or in the vicinity thereof (e.g. a space surrounded on its three sides by the abutting surface 12c of the cap body, the abutting surface 13c of the upper lid and the side surface of the upper lid). This causes hygiene issues. Particularly, in the embodiment as shown in FIGS. 1 and 2, the embodiment is intended to open the cap with a relatively weak force and suitable for this purpose. The reason is that the abutting surface 12c of the cap body and the abutting surface 13c of the upper lid are not in contact with each other at all when the cap body rotates around the side surface of the cylindrical opening to move toward the lower end and reach a point where the cap body is no longer able to rotate, although the abutting surfaces 12c, 13c are in contact with each other when the cap body rotates around the side surface of the cylindrical opening to move toward the upper end. Nevertheless, since the above-mentioned space existing at the abutting portion of the cap body and the upper lid or in the vicinity thereof is relatively large in the sealing state, water is liable to remain in this space when the container provided with such a sealing mechanism is subjected to the retort treatment.

Therefore, in another embodiment, it is preferable that the sealing mechanism of the present invention has a following structure to facilitate the drainage of the water remaining in the space S existing at the abutting portion 17 of the cap body and the upper lid or in the vicinity thereof, in a condition that the cap body reaches a point where the cap body is no longer able to rotate by rotating around the side surface of the cylindrical opening of the container body to move toward the lower end.

Figure 17:
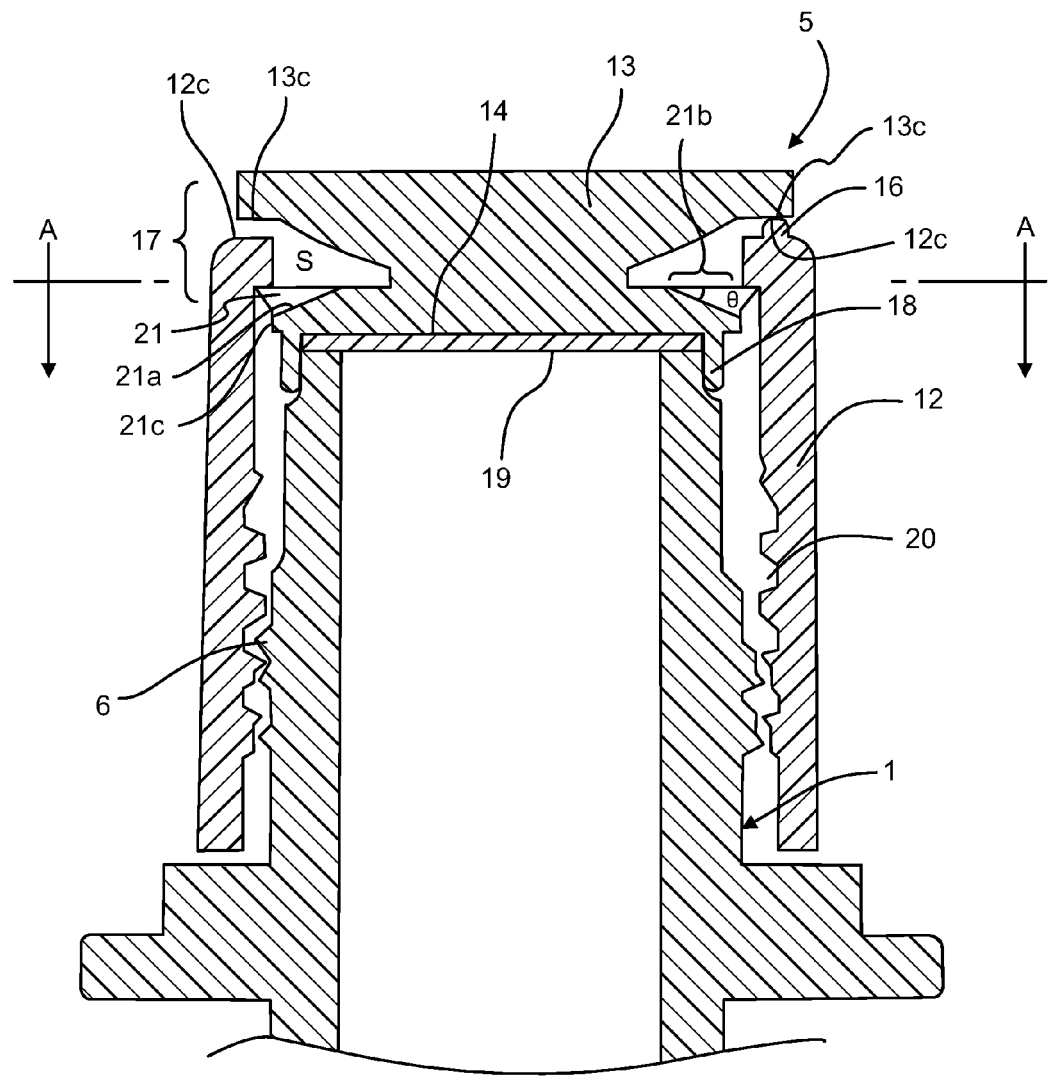
FIG. 17 is a sectional view illustrating another embodiment of the sealing mechanism for the container opening according to the present invention.

Namely, as shown in FIG. 17, in the case that the sealing mechanism of the present invention has a structure that the upper lid 13 is engaged with the inside of the cap body 12, it is preferable to form a cut-away portion 21 having an inclined plane 21a sloping down toward the circumference of the upper lid 13 on the abutting surface 13d of the upper lid 13 which abuts on the abutting surface 12d of the cap body when the cap body moves toward the lower end by rotating around the side surface of the cylindrical opening.

Figure 18:
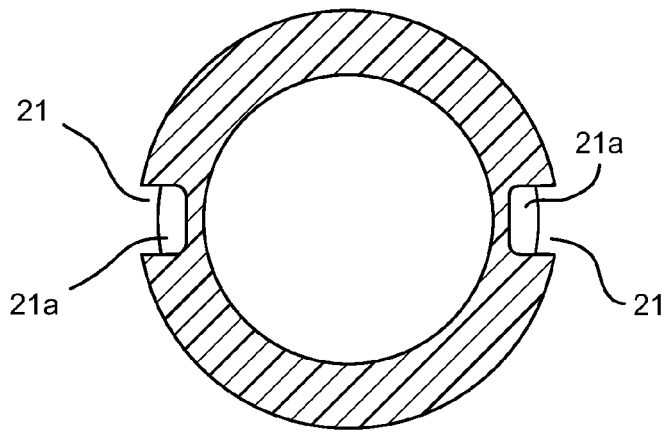
FIG. 18 is a sectional view along the line A-A of FIG. 17.

FIG. 18 shows a horizontal section along the line A-A at a level of the abutting surface 13d of the upper lid used in the embodiment of FIG. 17. In this embodiment, two cut-away portions 21 are disposed oppositely on the abutting surface 13d of the upper lid.

The cut-away portion 21 forms a through passage extending from the abutting surface 13d of the upper lid to the side surface of the upper lid 21c existing at the lower level than the level of the abutting surface 13d. Therefore, in the sealed condition, at least a part of the recess of the cut-away portion is not covered by the cap body. Namely, the cut-away portion on the abutting surface 13d of the upper lid has an opened portion 21b which is not covered by the abutting surface 12d of the cap body, as shown in FIG. 17.

The inclined plane 21a of the cut-away portion is typically a tapered plane as shown in the figure. Nevertheless, the cut-away portion may have another type of inclined plane, such as a groove having a V-shaped profile, which is sandwiched by a pair of sloped plane and sloping down toward the circumference of the upper lid.

The inclined angle θ toward the circumference of the upper lid is preferably not less than 30 degrees, more preferably not less than 45 degrees. Furthermore, the inclined angle is not more than 70 degrees, more preferably not more than 60 degrees.

Figure 19:
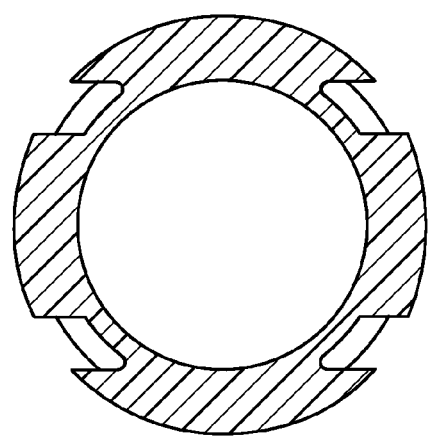
FIG. 19 is a sectional view illustrating a variation of the embodiment shown in FIG. 17.

FIG. 19 shows another embodiment of the disposition of the cut-away portions 21. In this embodiment, four cut-away portions 21 are disposed symmetrically on the abutting surface 13d of the upper lid. The number of the cut-away portions is not limited to any number. Nevertheless, usually, 2-6 cut-away portions are disposed symmetrically on the abutting surface 13d of the upper lid.

EXAMPLES (Fabrication of Content Drawing Device)

Figure 15:
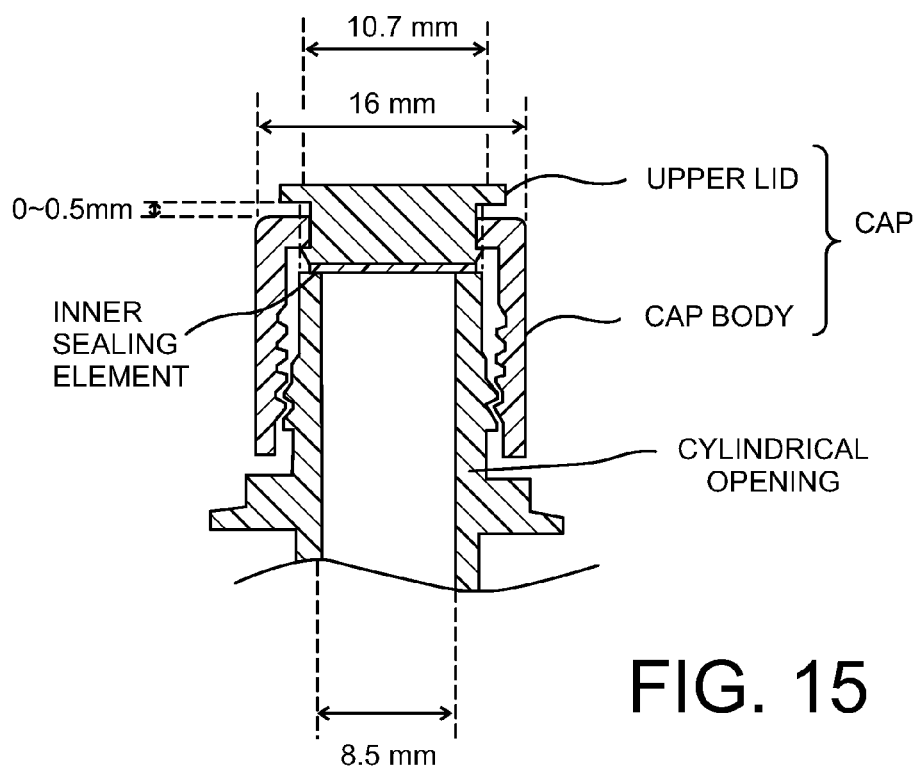
FIG. 15 is a sectional view partially illustrating an example of the content drawing device.
Figure 16:
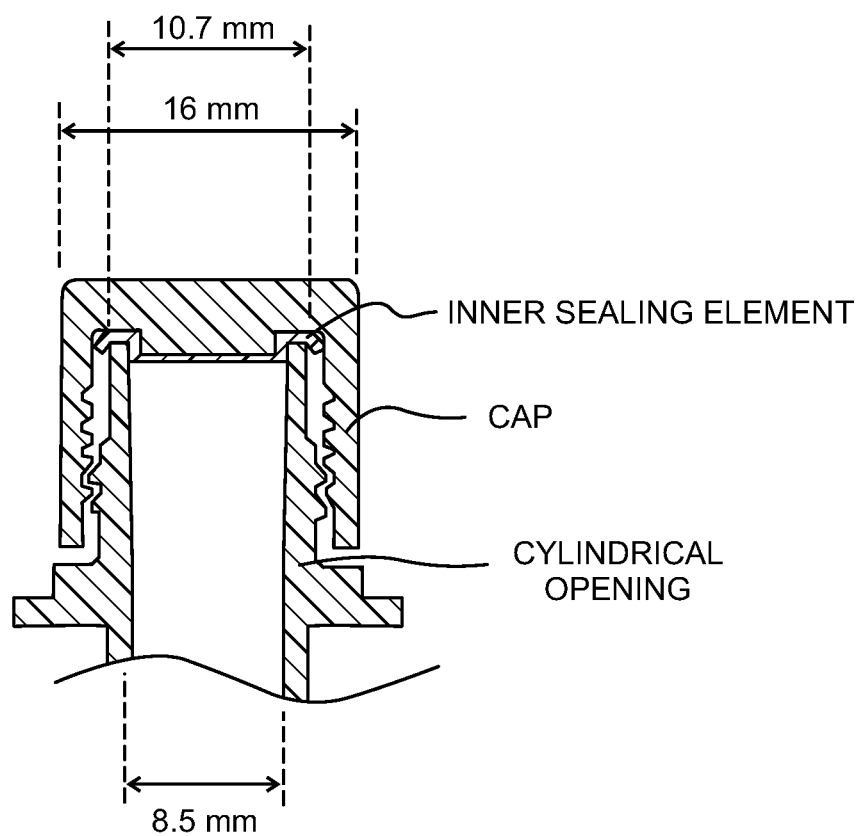
FIG. 16 is a sectional view partially illustrating a comparative example of the content drawing device.

Content drawing devices each having a fundamental structure which includes a cap and a straw portion as shown in FIG. 13 were fabricated as an example and a comparative example, respectively. The device as an example of the present invention has a structure of the straw portion and the cap as shown in FIG. 15. The device as a comparative example has a structure of the straw portion and the cap as shown in FIG. 16.

(a) Example

The cap body and the upper lid were separately produced from polypropylene. An inner sealing element was thermally bonded to the upper lid. The inner sealing element had a structure provided with: 30 μm of easy peel film; 12 μm of Al; 15 μm of ONY; 30 μm of easy peel film, in this sequence from the upper lid. After the thermal bonding, the upper lid is engaged into the cap body to form a cap (outer diameter was 16 mm) as an example. A gap between an abutting surface of the cap body and an abutting surface of the upper lid was up to 5 mm (see FIG. 15).

Then, the obtained cap was fastened to a cylindrical opening (made of polypropylene, inner diameter 8.5 mm, outer diameter 10.7 mm). Then, the inner sealing element was high frequency bonded to the cylindrical opening to form a content drawing device having the cap and the straw portion as shown in FIG. 15.

(b) Comparative Example

An inner sealing element was placed on an upper end surface of a cylindrical opening (made of polypropylene, inner diameter 8.5 mm, outer diameter 10.7 mm). A cap (made of polypropylene, outer diameter 16 mm) was fastened to the cylindrical opening on which the inner sealing element was placed, so that the inner sealing element was sandwiched between the upper end surface of the cylindrical opening and the cap. The inner sealing element had a structure provided with: 30 μm of easy peel film; 12 μm of Al; 15 μm of ONY; 30 μm of easy peel film, in this sequence from the cap.

Then, the inner sealing element was high frequency bonded to both the cap and the cylindrical opening to form a content drawing device having the cap and the straw portion as shown in FIG. 16.

(Opening Torque Measurement)

The maximum opening torque values of the content drawing devices as the example and the comparative example were measured by using a digital opening torque meter (available from NIDEC-SHIMPO CORPORATION).

The opening torque for generating a shear force at an adhesion interface between the inner sealing element and the cylindrical opening by the rotation of the cap, and thereby peeling off the inner sealing element from the cylindrical opening was 98 N-cm as for the content drawing device as the comparative example. On the contrary, the opening torque was 47 N-cm as for the content drawing device as the example. From this result, it was understood that the example according to the present invention allows the cap to be opened with an opening torque less than half of the opening torque of the comparative example. That is, the content drawing device as the example was superior in the sealing performance for keeping the content and in the easy opening feature.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2005-160265 filed on May 31, 2005 including the specification, claims, drawings and summary is incorporated herein by reference in its entirety.

What is claimed is:

1. A sealing mechanism for a container opening comprising:
   a cylindrical opening disposed on a container body; and
   a cap for sealing the cylindrical opening, wherein the cap comprises:
      a cap body having a cylindrical shape with open ends and a sidewall for covering the outer surface of the cylindrical opening, and provided with a thread portion disposed on an inner surface of the cap body for engaging with a thread portion disposed on the outer surface of the cylindrical opening, and capable of moving up and down while rotating around the outer surface of the cylindrical opening; and
      an upper lid for closing one of the open ends of the cap body, and adhering to an open end surface of the cylindrical opening with an inner sealing element to seal the cylindrical opening,
   wherein the inner sealing element is a composite film provided with a plastic film layer for fusibly bonding to the upper lid, an intermediate layer, and a heat seal layer for fusibly bonding to the cylindrical opening,
   wherein the cap body and the upper lid are adjacent to each other and the cap body can be rotated without rotating the upper lid,
   wherein a recessed portion around an outer circumferential surface of the upper lid and a protruding portion extending radially inward from the sidewall of the cap body are engaged, and
   when the cap body rotates around the outer surface of the cylindrical opening to move the cap body away from the container body, a first abutting surface of the protruding portion and a first abutting surface of the recessed portion are abutted to each other with surface-to-surface contact, and when the cap body rotates around the outer surface of the cylindrical opening to move the cap body towards the container body, a second abutting surface of the protruding portion and a second abutting surface of the recessed portion are abutted each other with surface-to-surface contact,
   wherein a width (L1) of the first abutting surface of the recessed portion in the radial direction is larger than a width (L2) of the second abutting surface of the recessed portion in the radial direction, and
   when the cap body is moved away from the container body, the cap body slidably abuts on the upper lid, and pushes up the upper lid to open the cylindrical opening, and when the cap body is moved towards the container body, the cap body abuts on the upper lid and pulls down the upper lid to re-seal the cylindrical opening.

2. A sealing mechanism according to claim 1, wherein a gap is exposed between the first abutting surface of the protruding portion and the first abutting surface of the recessed portion, thereby the first abutting surface of the protruding portion and the first abutting surface of the recessed portion are not abutted at all when the cap body rotates around the outer surface of the cylindrical opening to move the cap body towards the container body until the cap body reaches a point where the cap body is no longer able to rotate.

3. A sealing mechanism according to claim 1, wherein a projection is disposed on one position on either the first abutting surface of the protruding portion or the first abutting surface of the recessed portion.

4. A sealing mechanism according to claim 1, wherein the upper lid is detached from the cylindrical opening by pulling the upper lid away in a vertical direction relative to an adhesion interface between the cylindrical opening and the upper lid thereby substantially avoiding a shear force at the adhesion interface between the cylindrical opening and the upper lid.

* * * * *